United States Patent [19]

Kumagai

[11] Patent Number: 5,438,682
[45] Date of Patent: Aug. 1, 1995

[54] DATA PROCESSING SYSTEM FOR REWRITING PARALLEL PROCESSOR OUTPUT DATA USING A SEQUENTIAL PROCESSOR

[75] Inventor: Ryohei Kumagai, Tokyo, Japan

[73] Assignee: Yozan Inc., Tokyo, Japan

[21] Appl. No.: 297,110

[22] Filed: Aug. 26, 1994

Related U.S. Application Data

[63] Continuation of Ser. No. 114,236, Sep. 1, 1993, abandoned, which is a continuation of Ser. No. 596,023, Oct. 11, 1990, abandoned.

[30] Foreign Application Priority Data

Sep. 7, 1990 [JP] Japan .................... 2-235687

[51] Int. Cl.6 ................... G06F 15/76; G06T 1/00
[52] U.S. Cl. .................... 395/800; 364/DIG. 1;
 364/DIG. 2; 364/225; 364/229; 364/230;
 364/942.05; 364/931; 395/164; 382/304
[58] Field of Search ............... 395/164, 163, 162;
 382/41, 49, 27, 57

[56] References Cited

U.S. PATENT DOCUMENTS

| | | | |
|---|---|---|---|
| 4,306,286 | 12/1981 | Cocke et al. | 395/500 |
| 4,601,055 | 7/1986 | Kent | 395/650 |
| 4,665,556 | 5/1987 | Fukushima et al. | |
| 4,718,091 | 1/1988 | Kobayashi et al. | 364/133 |
| 4,720,871 | 1/1988 | Chambers | |
| 4,908,644 | 3/1990 | Shindo et al. | 364/724.12 |
| 5,125,045 | 6/1992 | Murakami et al. | 395/650 |

FOREIGN PATENT DOCUMENTS 0274376 7/1988 European Pat. Off.
0327817 8/1989 European Pat. Off.

*Primary Examiner*—Parshotam S. Lall
*Assistant Examiner*—Timothy L. Philipp
*Attorney, Agent, or Firm*—Cushman, Darby & Cushman

[57] ABSTRACT

A system for performing parallel processing of digital data in order to compute numerical functions and extract characteristic information based on the digital data. After the digital data is processed by the parallel processing portion, a sequential processing portion rewrites the processing data according to a sequential processing operation so that operations such as thinning and labelling may be performed.

6 Claims, 12 Drawing Sheets

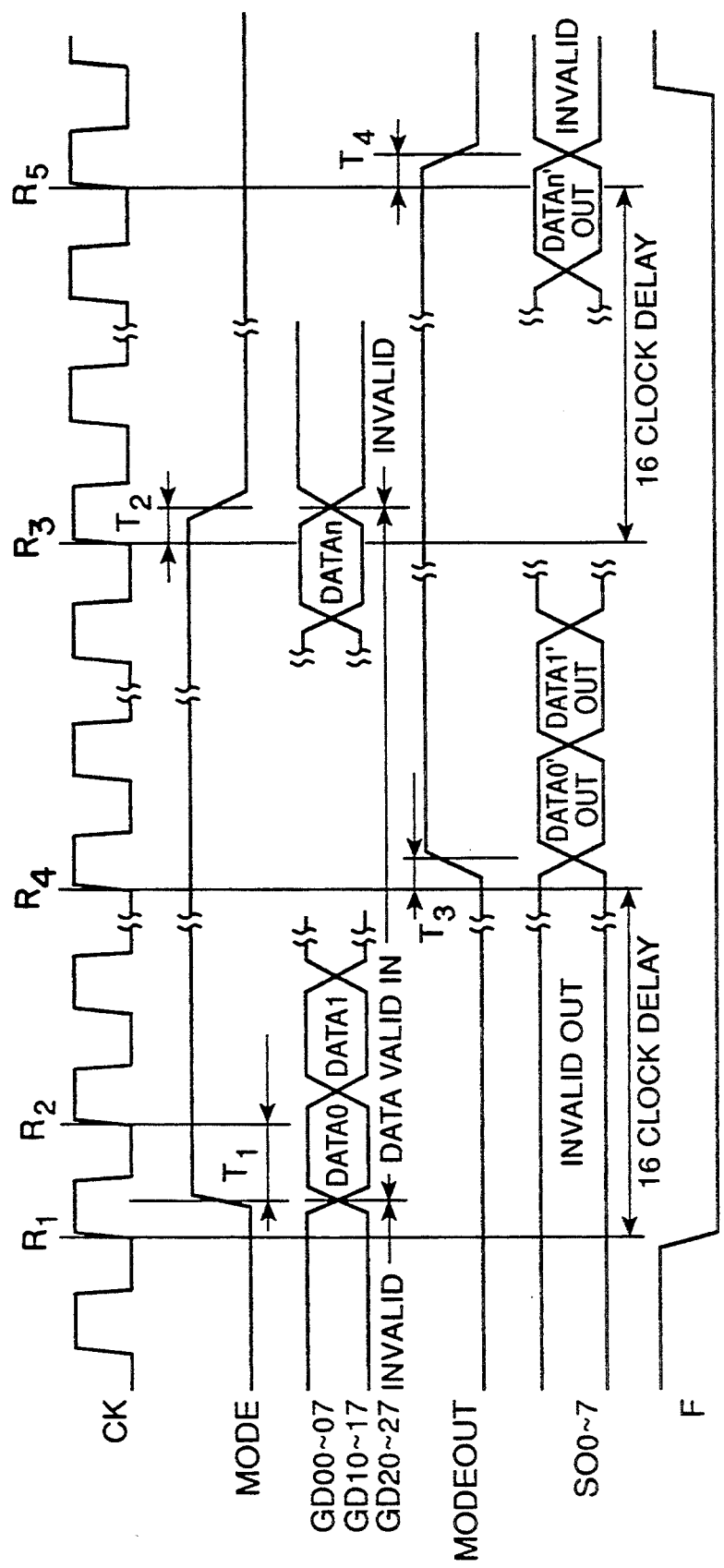

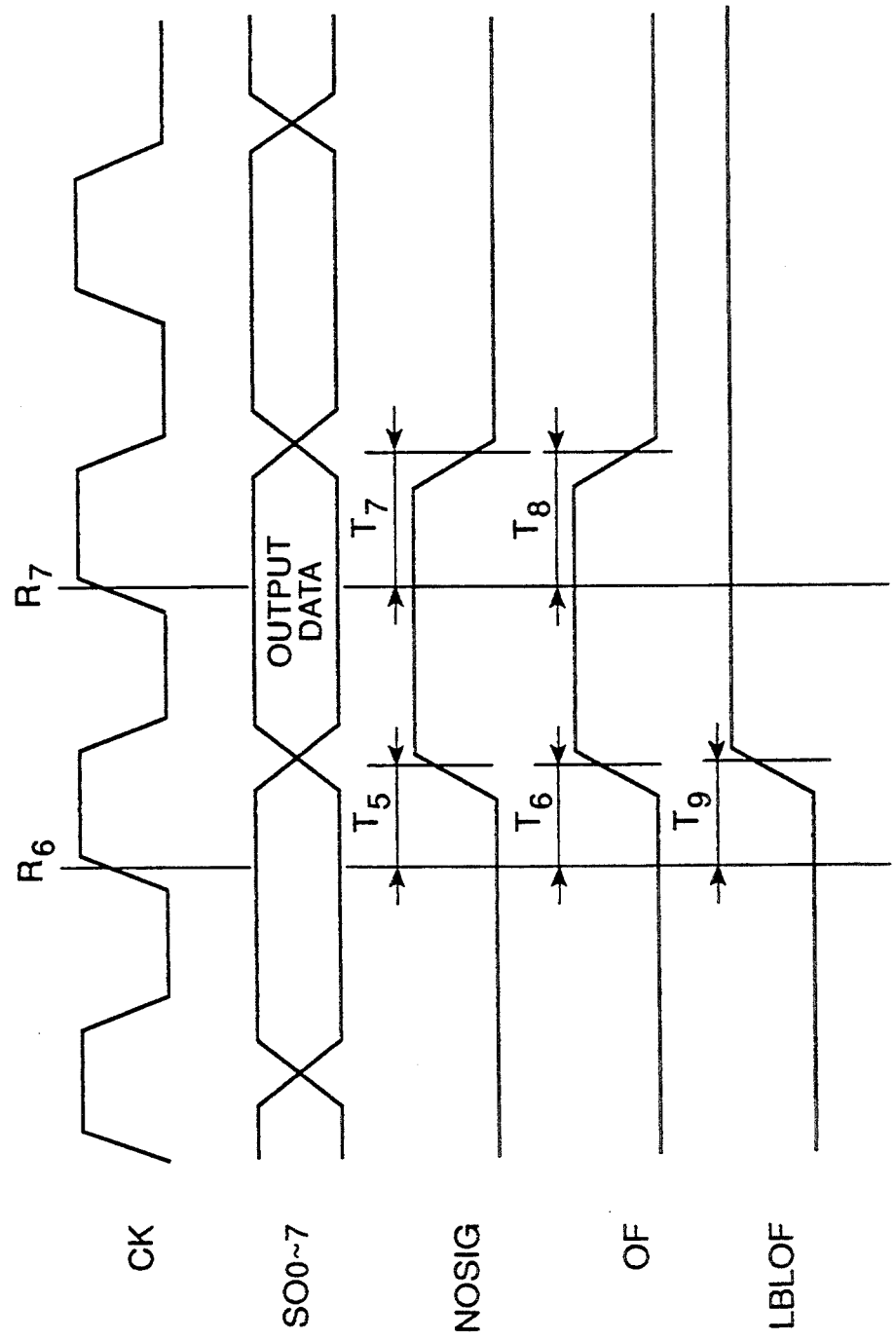

| a | b | c |
|---|---|---|
| d | e | f |
| g | h | i |

FIG. 6

| A | | | B | | | C | | | D | | |
|---|---|---|---|---|---|---|---|---|---|---|---|
| a | b | c | i | h | g | g | d | a | c | f | i |
| CON. | f | e | CON. | d | e | h | CON. | e | b | CON. | e |
| 0 | 0 | 0 | 0 | 0 | 0 | 0 | 0 | 0 | 0 | 0 | 0 |

FIG. 7

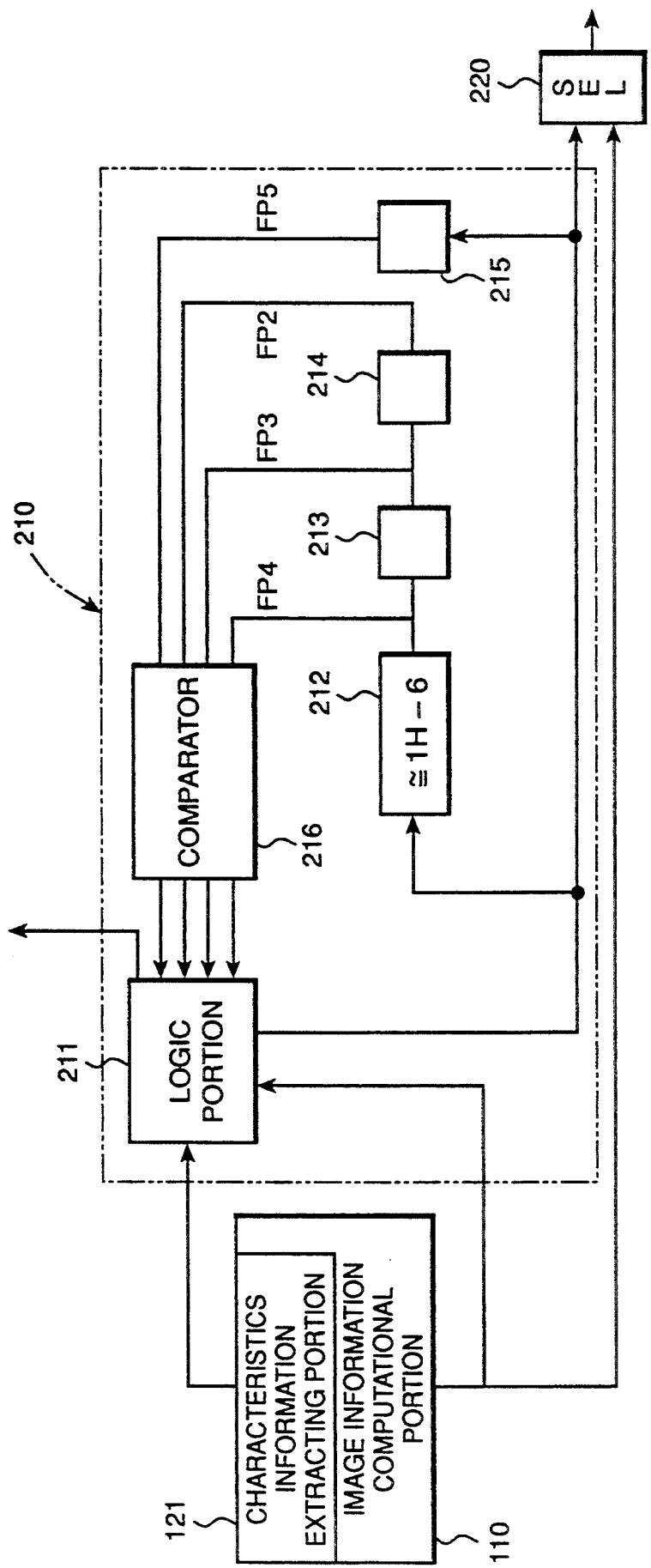

DATA PROCESSING SYSTEM FOR REWRITING PARALLEL PROCESSOR OUTPUT DATA USING A SEQUENTIAL PROCESSOR

This is a continuation of application Ser. No. 08/114,236, filed on Sep. 1, 1993, which was abandoned upon the filling hereof which is a continuation of application Ser. No. 07/596,023, filed Oct. 11, 1990 (abandoned).

BACKGROUND OF THE INVENTION

1. Field of the Invention

The present invention relates to a data processing system in an image recognition system or an acoustic recognition system, for example.

2. Description of the Related Art

When a processing system for a large quantity of digital data, for instance image data, is to be designed, an IC used for digital signal processing or a CPU having larger memory capacity is necessary. When the CPU is used, the processing manner relies on the command cycle of the CPU and high speed processing cannot be expected. When the IC is used, commands may be provided for a basic function used in image processing, such as data transmission, but actual image processing such as reducing noise and filtering are either not achieved or minimally achieved.

When an image processing system of wide usage and good performance is designed, it is necessary to design a lot of hardware and IC's. Consequently, the expense and time for development cannot be reduced.

SUMMARY OF THE INVENTION

The present invention solves the above-mentioned problems and has an object to provide a large quantity digital data processing system of wide usage and good performance.

A data processing system according to the present invention mainly processes characteristics extraction and comprises a computational portion which performs status computation as well as numerical computation. It is constructed as a module with a sequential processing portion indispensable to sequential processing. Therefore, it can correspond actual digital data processing such as image processing and so on independently, and can be inputted in a sequential processing portion in which delay memory capacity is determined according to the data capacity. This means that it has wide-usage.

BRIEF DESCRIPTION OF THE DRAWINGS

FIG. 2 shows the timing of input and output to/from the data processing system.

FIG. 3 shows the relationship between flag signal and image output data bus signal.

FIG. 6 shows a diagram of 3×3 convolution.

FIG. 7 shows the share of input data of integration portion.

FIG. 10 shows a block diagram of the structure of sequential processing unit.

FIG. 11 shows pixel data of 3×3 convolution to explain the processing in sequential processing portion.

FIG. 17 (a) shows a diagram of a vertical line with 2 pixels width of the result after processing.

FIG. 17 (b) shows a diagram of a horizontal line with 2 pixels width of the result after processing.

FIG. 18 (a) shows a diagram added 1 pixel to a vertical line with 2 pixels width.

FIG. 18 (b) shows a diagram added 1 pixel to a horizontal line with 2 pixels width.

FIG. 19 (a) shows a diagram of the result after performing processing in FIG. 15 (a).

FIG. 19 (b) shows a diagram of the result after performing processing to FIG. 15 (b).

PREFERRED EMBODIMENT OF THE PRESENT INVENTION

Hereinafter, the present invention is described with referring to the attached drawings.

Figure 1A:
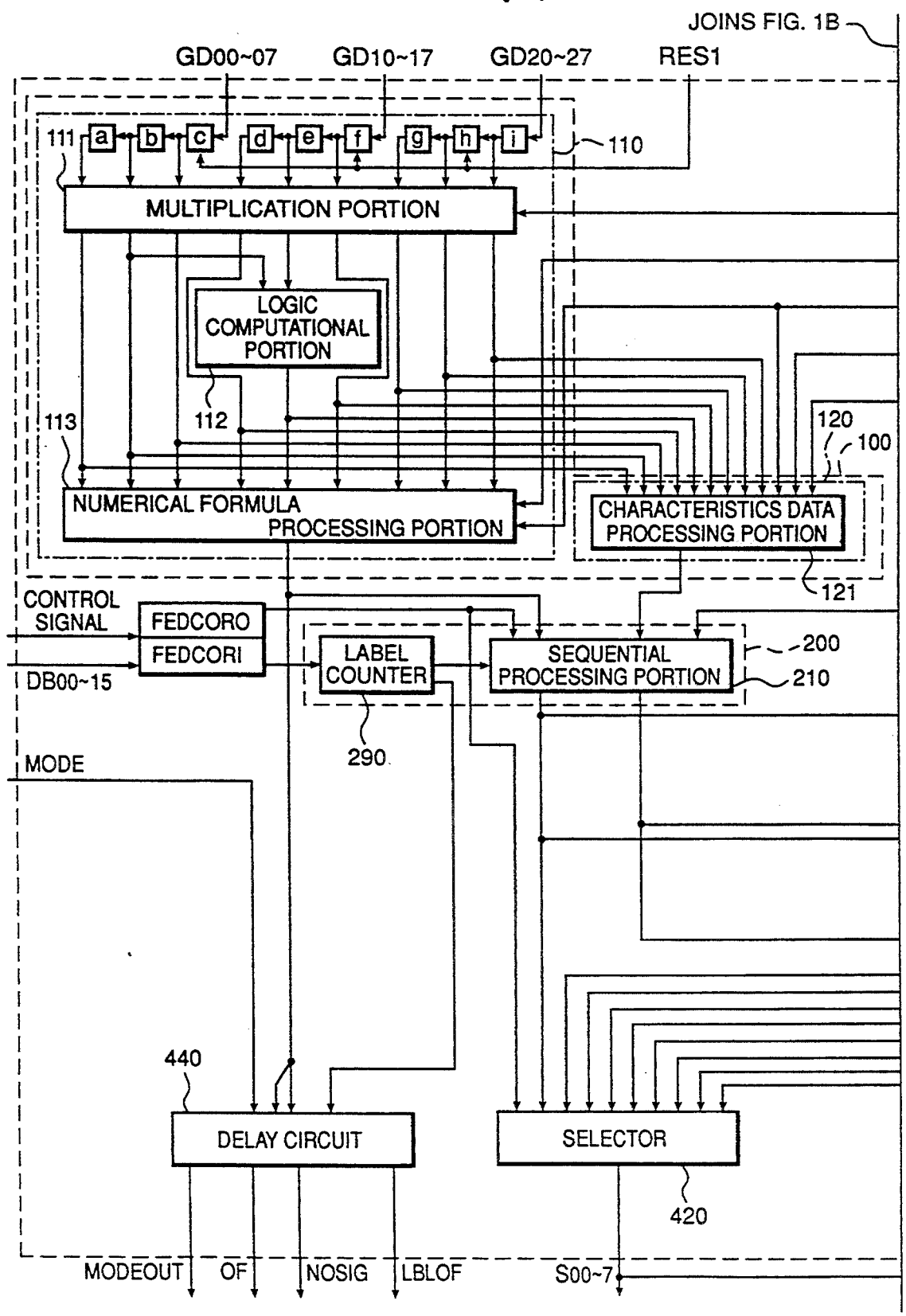
FIGS. 1 (a) and 1 (b) shows a block diagram of the first embodiment of the present invention.
Figure 1B:
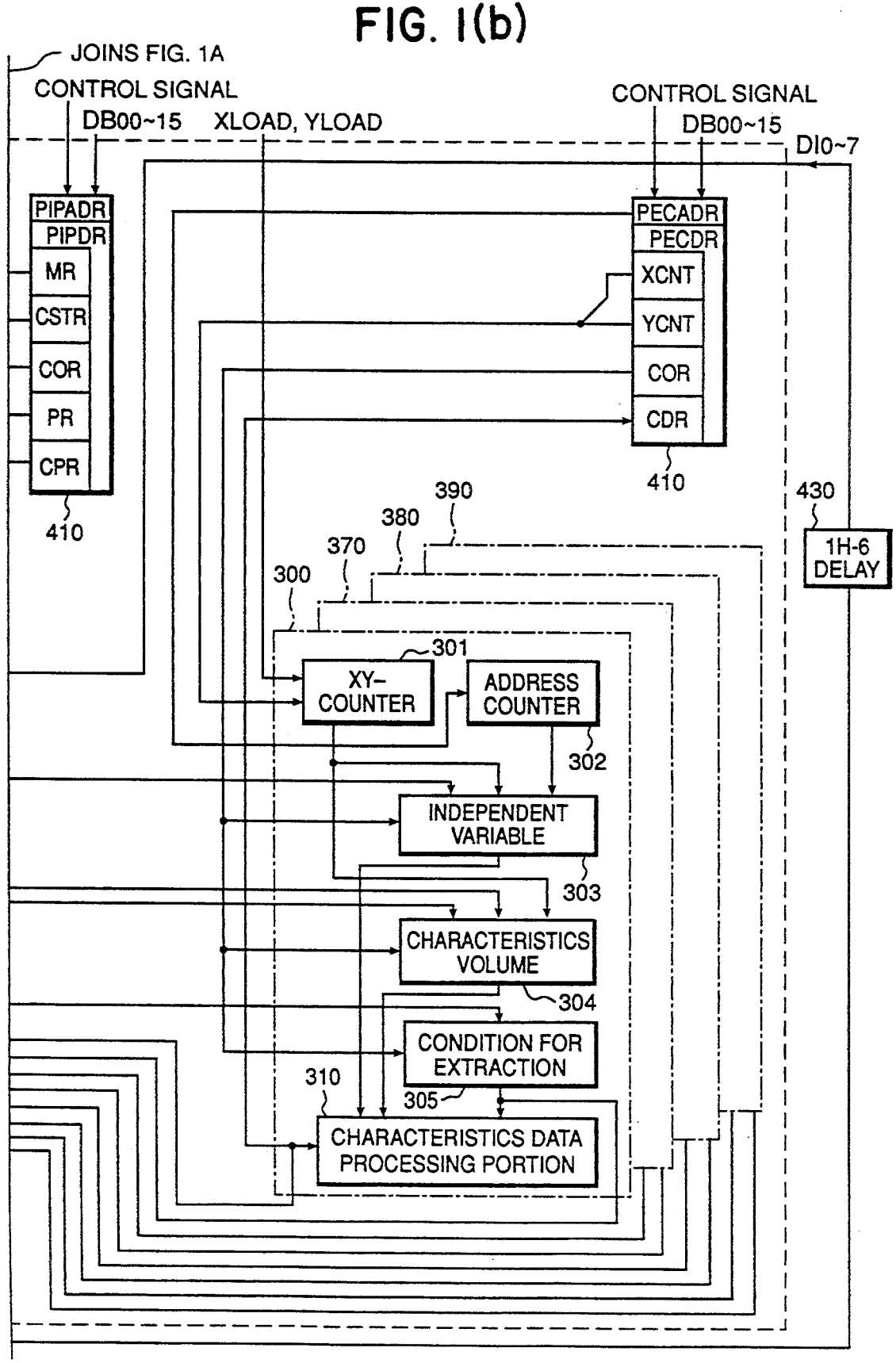

FIGS. 1 (a) and 1 (b) shows a data processing system of the present invention. The data processing system is located in, for example, a system for recognizing a letter/character inputted from a video camera which is not shown in the figure. The data processing system comprises computational portion 100 which includes image information computational portion 110 and the first information compression system 120, feedback control portion 200 and four of the second information compression systems 300, 370, 380 and 390. As described later, computational portion 100 performs a certain numerical computation, feed back control portion 200 performs so-called sequential-type processing and information compression systems 300, 370, 380 and 390 extract characteristic value of the data to be processed.

In computational portion 100, image information computational portion 110 is a circuit to perform a certain numerical computation, comprises 9 flip-flops from "a" to "i," multiplication portion 111, logical computational portion 112 and numerical formula processing portion 113. The first information compression system 120 is a circuit to perform status computation for extracting characteristic values and comprises characteristics information extracting portion 121. The data sent from a memory outside (not shown) is inputted to multiplication portion 111 through flip-flops from "a" to "i" and is outputted after a multiplication by a certain coefficient (a weight coefficient, for example). The output data is inputted to a logical computational portion 112 so that logical computations such as AND, OR, EXOR and so on, are performed. The logical computation result is inputted to numerical formula portion 113 and characteristics information extracting portion 121. Numerical formula portion 113 can calculate a maximal value (MAX), a minimal value (MIN) and an absolute value (ABS) as well as performing addition (+), substraction (−) and division, as described later. Characteristics information extracting portion 121 performs computations of neighborhood boundary information, number of neighborhood connectedness and neighborhood characteristics value and so on.

Feedback control portion 200 comprises sequential processing portion 210 and label counter 290, and is connected to computational portion 100 and the second information compression systems 300, 370, 380 and 390. Computation portion 100 performs parallel-type processing to compute, compare and judge the inputted pixel data. Sequential processing portion 210 performs sequence-type processing to rewrite data based on a condition after processing, such as co-relationship among other data. The sequence-type processing is necessary for thinning and labeling. Label counter 290 is a circuit to output labels (values) to be used on labeling in the sequential processing portion 210.

The second information compression systems 300, 370, 380 and 390 calculate characteristics value of the data to be processed by accumulation or comparison. The 4 second information compression systems have the same structure. Therefore, the structure of only information compression system 300 is shown. Information compression system 300 comprises address counter 301, XY-counter 302, independent variable settlement circuit 303, characteristic value settlement circuit 304, extracting condition settlement circuit 305 and characteristics data processing portion 310.

Characteristics data processing portion 310 performs addition (+) and substraction (−) to inputted data, and simultaneously, can calculate the maximal value (MAX) and the minimal value (MIN). Independent variable settlement circuit 303, characteristics value settlement circuit 304 and extracting condition settlement circuit 305 are the circuits to settle the conditions for processing in characteristics data processing portion 310. Independent variable settlement circuit 303 settles the extracting condition of input data such as "on what kind of condition input data is to be extracted," for instance "on all the pixels." Characteristics variable settlement circuit 304 settles the condition of characteristics variable such as "what kind of data to be extracted," for instance "the number of pixels." Extracting condition settlement circuit 305 settles the condition of extracting condition such as "for what kind of data to be extracted," for instance "on every labeled pixel." When these conditions are combined, characteristics data processing portion 310 performs the addition of "the number of pixels of every labeled pixel in all the pixels." The area of the labeled image is, therefore, calculated.

Address counter 301 designates the address of compressed data register CDR which is the memory of the second information compression systems 300, 370, 380 and 390. The processing data in characteristics data processing portion 310 is stored in a certain address in the memory. XY-counter 302 outputs the coordinates of X and Y on a point of horizontal scanning in a frame memory.

Computational portion 100, feedback control portion 200, information compression systems 300, 370, 380 and 390 work according to command signals stored in register 410, described later, and a certain processing result is outputted. The output data of each portion is selected in selector 420 and outputted to the outside of the present apparatus.

Register 410 is explained below.

Address register PIPADR is the register that holds addresses to be accessed by a host computer in reading or writing from or into data register PIPDR. The value of PIPADR of the address register is increased by one or every action of reading and writing of data register PIPDR.

Data register PIPDR is the register that stores necessary data in order to control computational portion 100's various actions. According to the data stored here, an edge point of an image is calculated or logical computation is executed, for example. For various processing, data is stored in multiplication register MR, numerical constant register CSTR, pattern register PR, comparate register CPR and control code register COR.

In multiplication register MR, the coefficient to be used for multiplication in multiplication portion 111 is stored. In numerical constant register CSTR, the numerical constant to be used for addition and subtraction in numerical formula processing portion 113 is stored. In pattern register PR, 3×3 template data to be used for the processing of pattern matching in characteristics information extracting portion 121 is stored. In comparate register CPR, specific brightness to be used for binarizing input pixel data in characteristic information extracting portion 121 is stored. In control code register COR, the data processing manner of the present apparatus, that is the parameter to settle the method of binarizing, is stored.

Control register FEDCOR0 and FEDCOR1 are the registers to store the necessary data for labeling and thinning in sequential processing portion 210. In control register FEDCOR0, the density value to be processed in selecting labeling is stored. The data processing manner in sequential processing portion 210, that is, the data to show that labeling or thinning in 4-connectedness was done, is also stored in it. In control register FEDCOR1, the label value on beginning labeling in the case of selection of labeling is stored.

Address register PECADR is the register to give inside address in order for the host computer to access data register PECDR by reading or writing. The value of the address register PECADR is increased one by one on every reading and writing in data register PECDR.

Data register PECDR comprises register XCNT and YCNT, control code register COR, and compressed data register CDR. In XCNT and YCNT, the initial values are stored of X and Y coordinates generated in XY-counter 302. In compressed data register CDR, the characteristics value extracted from information compression systems 300, 370, 380 and 390 are stored. In control code register COR, a control code to settle data processing from information compression systems 300, 370, 380 and 390 are stored.

The data processing manner means the data flow and the function of each block. It is decided, for example, the location in the information compression systems where the data outputted from characteristics information extracting portion 121 is inputted by the control code. As an example of the data processing manner, for example, each element of T, F, D and E of the Euler number are calculated by inputting the data outputted from characteristic information extracting portion 121 is a light computational portion (not shown).

Input and output signals for the present apparatus are described below.

Free-flag signal F (low assert) is the signal to switch the process mode of the present apparatus to a host mode or a local mode. When free-flag signal F is at a high level, the action mode is host mode; the host computer, now shown, can access register 410 of the present apparatus. That is, various command data is stored in register 410. The present apparatus does not work substantially in this case. On the other hand, when free-flag signal F is at a low level, it is in the local mode, and the present apparatus works according to the command data stored in register 410.

Register select signal RS is the signal to make a choice of the address register of PIPADR and PECADR or the data register of PIPDR and PECDR in register 410. When register select signal RS is at a low level, the address register is chosen. When register select signal RS is at a high level, the data register is chosen.

Data strobing signal DS (low assert) becomes data requiring signal when the host computer performs reading in the apparatus. It becomes the signal to show valid data is outputted into the data bus on the host computer side when the host computer performs writing in the present apparatus.

Writing signal W (low assert) is the input signal to control the direction of data transmission between the host computer and the present apparatus. When write signal W is at a high level, data is transmitted from the present apparatus to a host computer. When write signal W is at a low level, data is transmitted from a host computer to the present apparatus.

Reset signal RESET (low assert) is a signal to clear the condition inside of the present apparatus. When it is at a low level, the inside of the present apparatus is cleared. Compressed data registered CDR in data register PECDR is not cleared even when reset signal RESET is at a low level.

Therefore, when command data is written in register 410 from the host computer, the process is as follows. First, free-flag signal F is settled in a high level and the present apparatus becomes a host mode; second, reset signal RESET is settled in a low level and the data in the present apparatus is cleared; third, one or two is selected, address register of PIPADR and PECADR, or data register PIPDR and PECDR; finally, write signal W is transmitted from the host computer to the present apparatus in a low level.

Local reset signal RES1 (low assert) is a signal to clear the first step of flip-flops "c," "f" and "i" which latch data to be inputted as image input data bus signals from GD00 to GD07, from GD10 to GD17, and from GD20 to GD27. When RES1 is at low level, the flip-flops are cleared.

Mode signal MODE is a term signal to show the term in which valid data is inputted as image input data bus signals from GD00 to GD07, from GD10 to GD17, and from GD20 to GD27, in a high level signal.

Mode output signal MODEOUT is a term signal to show the term in which valid data is outputted as image output data bus signal from SO0 to SO7 in a high level output.

Image input data bus signal from GD00 to GD07, from GD10 to GD17, and from GD20 to GD27 are bus signals to input image data in the present apparatus. The data inputted through image input data bus signals from GD00 to GD07, from GD10 to GD17, and from GD20 to GD27 is latched on flipflops from "a" to "i." They are inputted into multiplication portion 111 as image data in the area of 3×3 convolution.

Image input data bus signals from DI0 to DI7 are bus signals for inputting feedback data necessary to perform sequential processing such as thinning, labeling, and so on. The signals are inputted to sequential processing portion 210, delaying data of 1 horizontal scanning line minus 6 pixels in delay circuit 430.

Image output data bus signals from SO0 to SO7 are output bus signals and are outputted with the same period of rise of clock signal CK.

Clock signal CK is the standard signal to perform pipe-line processing in the present apparatus. The processing speed of the present apparatus changes by the clock frequency of the clock signal. Image data is inputted and outputted with the same period of rise as the clock signal.

FIG. 2 shows the timing of data inputted into the present apparatus and of data outputted from it.

Clock signal CK is outputted with a certain frequency. When CK rises as R1, free-flag signal F becomes a low level and a local mode is settled. After a certain period T1 from the second rise of clock signal CK, mode signal MODE rises and becomes a high level signal. During the output of the high level signal, image input data bus signals from GD00 to GD07, from GD10 to GD17, and from GD20 to GD27 are regarded as valid data. Mode signal MODE falls from rise of clock signal R3 after a certain period T2.

When 16 of clock signals CK are outputted after R1 of rise of clock signal and R4 of the clock signal rises, mode output signal MODEOUT becomes a high level signal after a certain period T3. Image output data bus signals from SO0 to SO7 are regarded as valid data by the high level signal. When 16 of clock signals CK are outputted after R3 of rise of clock signal which is just before the fall of mode signal MODE and R5 of the clock signal rises, mode output signal MODEOUT becomes a low level signal after a signal period T4. Consequently, image output data bus signals from SO0 to SO7 are regarded as invalid data. After this free-flag signal F becomes a high level and the present apparatus is switched to a host mode from local mode.

In FIG. 1 (a), overflow flag signal OF is a flag signal to show by outputting high level output that overflow has occurred in a computation result of image information computational portion 110.

Sign flag signal NOSIG is a flag signal to show by outputting a high level output that under flow is generated in a computation result of image information computational portion 110.

Label counter over flow flag signal LBLOF is a signal to show by a high level output that the count value of label counter 290 overflowed.

FIG. 3 shows the relationship among flag signals OF, NOSIG and LBLOF and image output data bus signals from SO0 to SO7.

Sign flag signal NOSIG and overflow flag signal OF are usually at a low level. When under flow or overflow is generated in a computation result of image information computational portion 110.

Label counter overflow flag signal LBLOF is a signal to show a high level output that the count value of label counter 290 overflowed.

FIG. 3 shows the relationship among flag signals OF, NOSIG, and LBLOF and image output data bus signals from SO0 to SO7.

Sign flag signal NOSIG and overflow flag signal OF are usually at a low level. When under flow or overflow is generated in a computation result of image information computational portion 110, NOSIG and OF become a high level signal. The rises of the high level signals are completed while certain times T5 and T6 are passed from R6 of the rise of clock signal CK. Sign flag signal NOSIG and overflow flag signal OF set until certain times T7 and T8 pass from R7 of the rise of the next clock signal.

Label counter overflow flag signal LBLOF is usually a low level signal. It becomes a high level signal when the count in label counter 290 overflows. The rise is completed during a certain time T9 from R6 of clock signal CK.

X-counter set signal XLOAD (low assert) is a signal to give load signal to X-counter 302 in the present apparatus. When XLOAD of X-counter set signal is at a low level, the value stored in XCNT in data register PECDR is set in X-counter 302 as the initial value at the same timing of the rise of clock signal CK. When X-counter set signal XLOAD is at a high level, the value of X-counter is increased at the same timing of the rise of clock signal CK, and data coordinates inputted as image input data bus signal from GD00 to GD07, from GD10 to GD17 and from GD20 to GD27 are stored.

Y-counter set signal YLOAD (low assert) is a signal to give load signal to Y-counter 302 in the present apparatus. When Y-counter set signal YLOAD is at a low level, the value stored in YCNT in data register PECDR is set in Y-counter 302 as the initial value at the same timing of the rise of clock signal CK. When Y-counter set signal XLOAD is high level, at the same timing of the clock signal CK just after the set of X-counter set signal XLOAD, the value of Y-counter is increased and data coordinates inputted as image input data bus signal from GD00 to GD07, from GD10 to GD17 and from GD20 to GD27 are stored.

Bidirectional data bus signal from DB00 to DB15 are bus signals to transmit data from/to host computer to/from the present apparatus.

Mode signal MODEOUT, overflow flag signal OF, sign flag signal NOSIG and label counter overflow flag signal LBLOF are outputted from the present apparatus through delay circuit 440.

Figure 4:
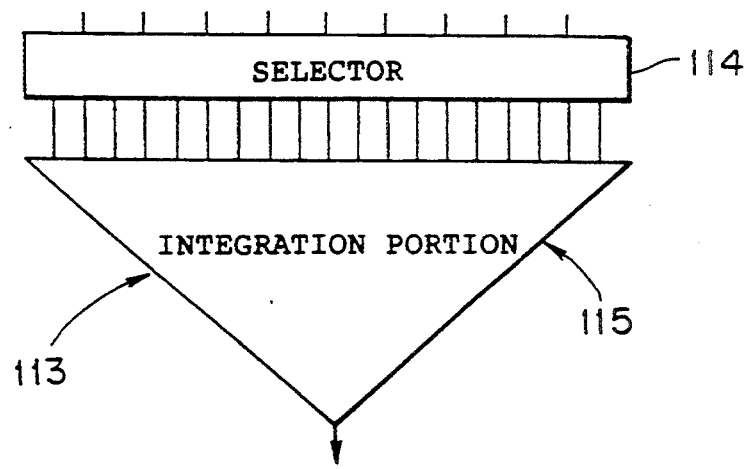
FIG. 4 shows a block diagram of the structure of numerical formula processing portion.

FIG. 4 shows the structure of numerical formula processing portion 113, which comprises selector 114 and integration portion 115. After the processing in multiplication portion 111 and logical computational portion 112, the data inputted in selector 114 is selected in it according to a desired purpose and inputted to a certain terminal in integration portion 115. The number of output terminals of selector 114 is the same as or more than the number of input terminals. Selector 114 leads the data inputted from an input terminal to any output terminal and distributes among any plural output terminals. Integration portion 115 performs addition, substraction, and other computation, and integrates the data inputted from selector 114, as mentioned below.

Figure 5:
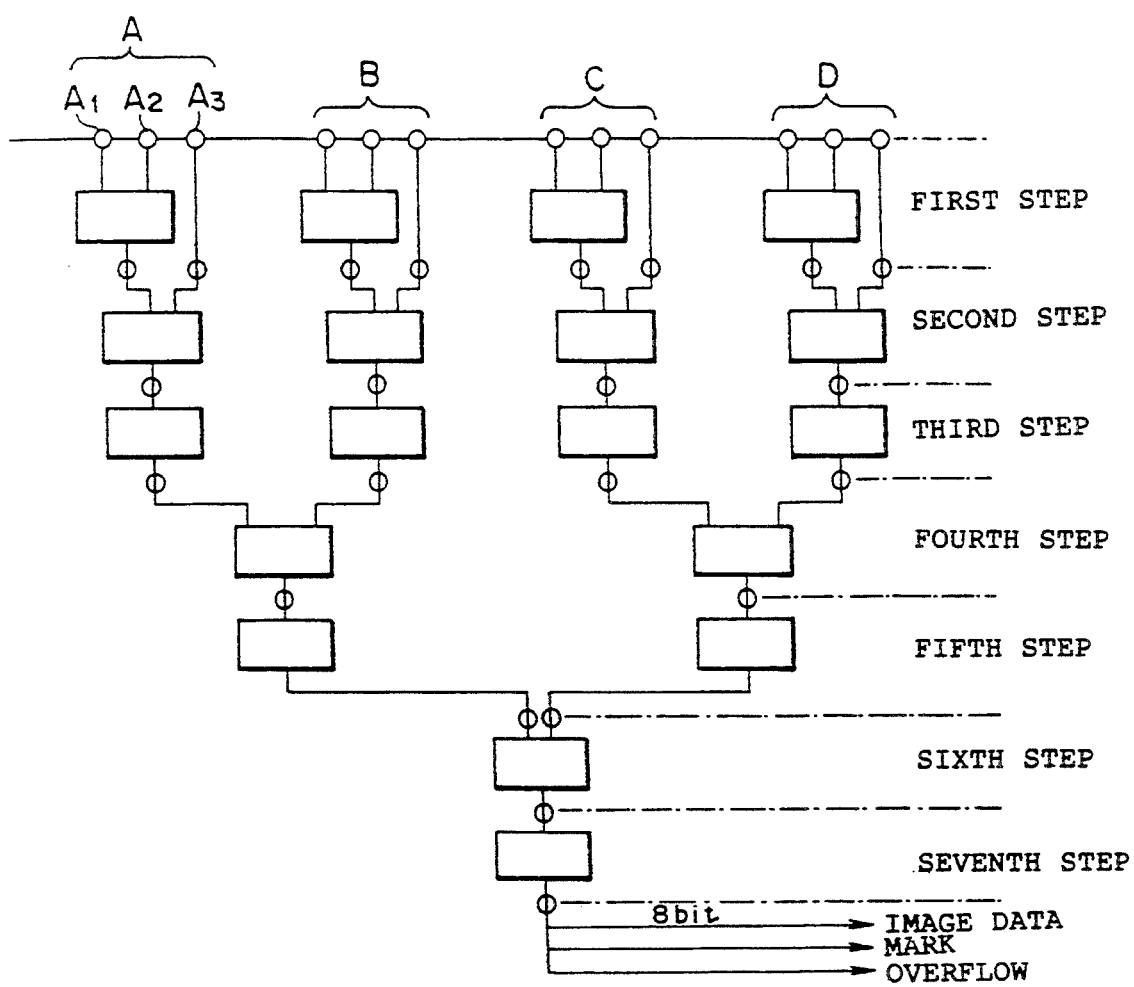
FIG. 5 shows a block diagram of the structure of an integration portion.

FIG. 5 shows the structure of integration portion 115. As shown in it, integration portion 115 comprises 7 steps of pipe-line structures. In the figure, "0" means D flip-flop, in which data is held in each step and sent to the next step in response to a synchronous signal.

In the first, second, fourth and sixth steps, addition or subtraction is performed, or the maximal or the minimal value can be calculated. In the third and the fifth step, the absolute value can be calculated, or input data can be outputted as it is. In the seventh step, the absolute value can be calculated or input data can be outputted as it is. Furthermore, performing bit shift to input data, computation of ($\frac{1}{2}$") is performed, or it is possible to fix the maximal value for input data to be "255" and the minimal value to be "0."

Input data for integration portion 115 is described below referring to FIG. 6 and to FIG. 7. FIG. 6 shows 3×3 convolutions, in which pixel data is given references from "a" to "i" for each. FIG. 7 shows the distribution of input data in integration portion 115. Groups A, B, C and D correspond to A, B, C and D in FIG. 5, respectively. As to input terminal A1 in group A, for example, one of three of pixel data "a," constant value "CON," or "0" can be inputted selectively. In the same way, one of three of pixel data "b," "f" or "0" can be inputted selectively to input terminal A2. One of three of pixel data "c," "e" or "0" can be inputted selectively to input terminal A3.

Since the input data is distributed and selectable, the integration portion becomes wide in usage or in processing manner. When a Sobel operator is executed, which is one of complex computation in image processing, the number of terms of inputs is settled in 12 systems. Since computation becomes complicated when the number of parameters steeply reduces in one step, reduction is executed through 4 steps and input of 12 systems are distributed to A to D of 4 groups.

Figure 8:
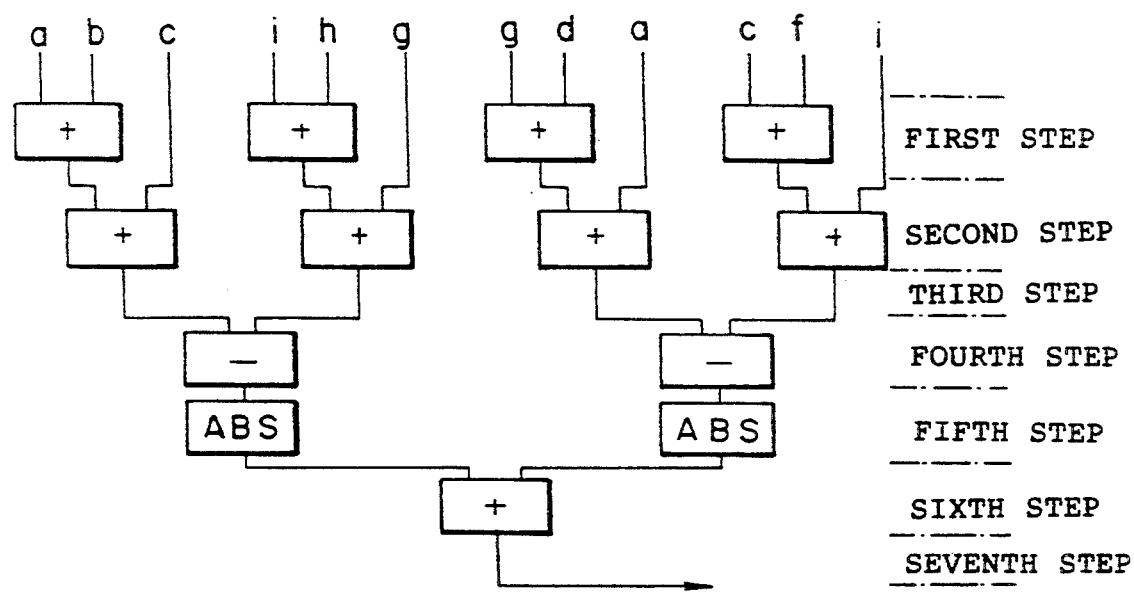
FIG. 8 shows the processing of each step of an integration portion on performing Sobel operator.

FIG. 8 shows the processing on each step in integration portion 115 when a Sobel operator is performed. The Sobel operator is expressed by the formula below.

$$|a+b+c-g-h-i| + |a+d+g-c-f-i| \qquad (1)$$

"b," "d," "f" and "h" in formula (1) are expected to be multiplied by "2" in multiplication portion 111 beforehand. In FIG. 8, in the first and second step, addition is performed and (a+b+c), (g+h+i), (a+d+g) and (c+f+i) are calculated. Nothing is performed on the third step. In the fourth step, subtraction is performed. In the fifth step, an absolute value is calculated. Consequently, $|a+b+c-g-h-i|$ and $|a+d+g-c-f-i|$ are calculated. In the sixth step, addition is performed. Formula (1) is executed through the process above. Nothing is performed in the seventh step.

Figure 9:
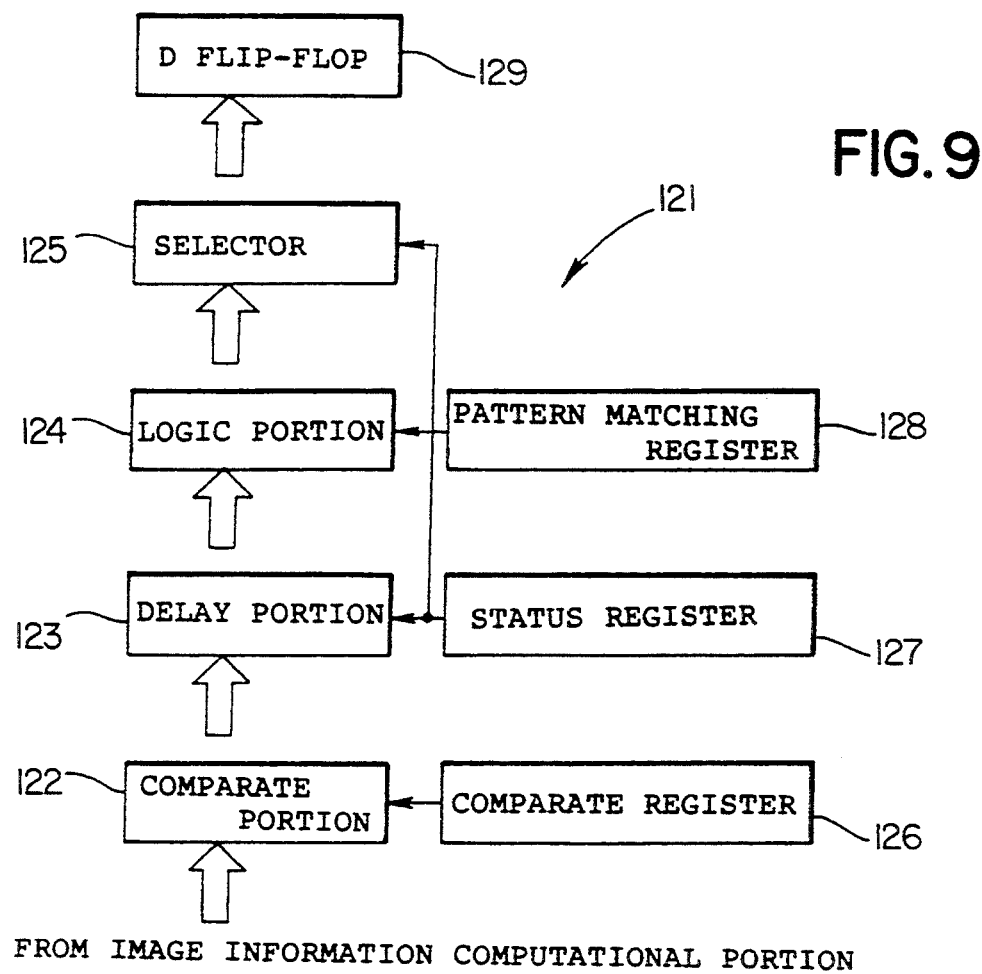
FIG. 9 shows a block diagram of the structure of characteristic information extraction portion.

FIG. 9 shows the structure of characteristic information extracting portion 121. Characteristic information extracting portion 121 is constructed by connecting comparator portion 122, delay portion 123, logic portion 124 and selector 125, sequentially.

8 bit data on the previous step of selector 114 (in FIG. 4) of numerical formula processing portion 113 is inputted dividely to comparator portion 122. Comparator portion 122 is connected to compare register 126, in which the threshold to binarize 8 bit data is registered. That is, comparator portion 122 compares inputted 8 bit data to the threshold and outputs 1 bit data, which is inputted to delay portion 123.

Delay portion 123 outputs the data transmitted from comparator portion 122 by delaying it so that the output of image information computational portion 110 and the output of characteristic information extracting portion 121 are performed in the same timing. The delay time is registered in status register 127 connected to delay portion 123.

The output data of delay portion 123 is inputted to logic portion 124 and various processing are performed, as described later. Pattern matching register 128 is connected to logic portion 124 in which templet data of 3×3 is registered as a comparison object in the case of calculating identification ratio.

Logic portion 124 judges an object pixel and calculates neighborhood boundary information, number of neighborhood connectedness and neighborhood characteristic value. Object pixel judgment decides whether inputted pixel data is to be processed or not. The judgment is "pixel to be processed" or "pixel not to be processed." Neighborhood boundary information is the number of pixels with "0" of binary pattern data in 4-correctedness or 8-connectedness. The number of neighborhood connectedness is the number of connectedness with the object of data of "1" in 4-connectedness or 8-connectedness. Neighborhood characteristics value is neighborhood pattern information, the number of each element of an Euler number, and identification ratio for binary pattern data. Neighborhood pattern information adopts the pixel condition of 4-neighborhood or 8-neighborhood as its data. The element of an Euler number is T, F, D and E, as is well known. Identification template data is registered in pattern matching register 128. Comparing pixels corresponding to each other, the number of pixels with different values is calculated through the processing of identification ratio.

The data outputted from selector 125 is transmitted to D flip-flop 129. It is held here and outputted. It means that output data from characteristics information extracting portion 121 is outputted synchronously by D flip-flop.

FIG. 10 shows the structure of sequential processing portion 210. It comprises logic portion 211, delay portion 212, flip-flop 213, 214, 215 and comparator 216. Selector 220 is settled on the output side of sequential processing portion 210. Selector 220 leads one of two outputs of image information computational portion 110 and sequential processing portion 210 to the second information compression system 300, 370, 380 and 390 (shown in FIG. 1 (b).

Neighborhood information from characteristics information extracting portion 121, that is the signal showing if each pixel of the 8-neighborhood is the same as the counter pixel is inputted. The output of logic portion 211 is lead to delay portion 212, flip-flop 215 and selector 220. Delay portion 212 outputs the inputted pixel data with delay time subtracted 6 pixels from a scan line. Delay portion 212 is connected to flip-flop 213, which is connected to flip-flop 214. Outputs of delay portion 212, flip-flop 213, 214 and 215 lead to comparator 216, whose output is lead to logic portion 211.

Flip-flops 213, 214 and 215 work as latches. Therefore, delay portion 212, pixel data outputted from flip-flops 213, 214 and 215 are inputted to comparator 216 simultaneously.

The pixel data processed in sequential processing portion 210 is the pixel data of a 3×3 convolution as shown in FIG. 11. A part of these pixel data is already processed in sequential processing portion 210. Pixel data is inputted to the present apparatus in the order of FP4, FP3, FP2 . . . FP5, P0, P1 . . . P6, P7, P8 along the horizontal scan line. To logic portion 211, already processed pixel data FP4, FP3, FP2 and FP5 is inputted by the action of delay portion 212, flip-flop 213, 214 and 215 and unprocessed pixel data P0, P1, P6, P7 and P8 are inputted from image information computational portion 110. Sequential processing portion 210 rewrites the once processed data according to a condition, in this way.

Comparator 216 judges if the inputted pixel data has its density in performing labeling. It does not work substantially on the process of thinning.

Figure 12:
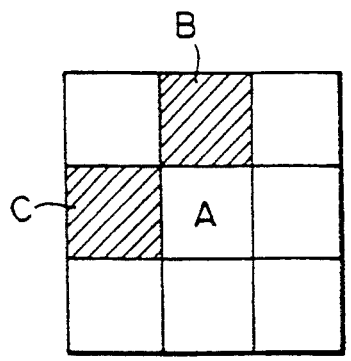
FIG. 12 shows a diagram of the first judgment condition for thinning for 3×3 convolution.
Figure 13:
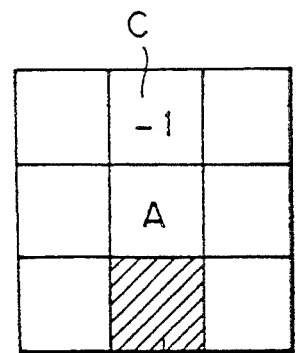
FIGS. 13, 14, 15 and 16 show the second to the fifth judgment conditions, respectively.
Figure 14:
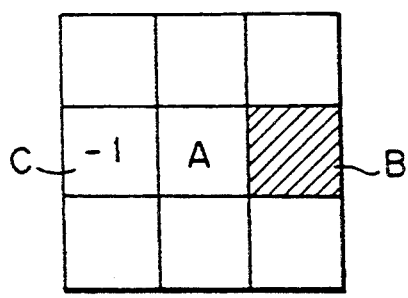
Figure 15:
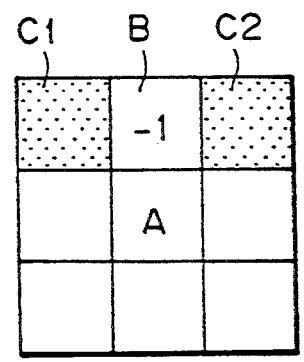
Figure 16:
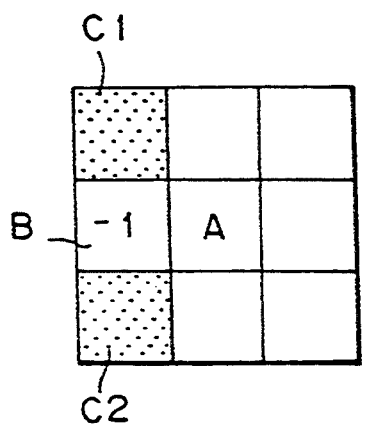

In the present embodiment, thinning prevents the dying out of a line with a 2-pixel width. The following conditions from a-1) to a-v) are adopted to execute it. In 3×3 convolutions in FIGS. from 12 to 16:

a-i) When the pixel on the left side of object pixel "A" has the pixel value of the same value of background pixels ("0," for example), an indicative pixel value different from a usual pixel value is given to object pixel "A" (a pixel value which is impossible to exist in the image, for example "−1") (shown in FIG. 12).

a-ii) Objective pixel "A" is kept as it is when the condition does not agree with a-i), pixel "C" on objective pixel "a" has the indicative pixel value and pixel "B" under pixel "A" has the value same as the background pixel, judged in the sequential-type (shown in FIG. 13).

a-iii) Objective pixel "A" is kept as it is when the condition does not agree with a-i), pixel "C" on the left side of objective pixel "A" has the indicative pixel value and pixel "B" on the right side of pixel "A" has the value same as the background pixel value, judged in the sequential-type (shown in FIG. 14).

a-iv) The value of objective pixel "A" is decided to be an indicative pixel value when the condition does not agree with a-i) to a-iii), pixel "B" on left side of objective pixel "A" has the indicative pixel value judged in the sequential-type, and pixels "C1" and "C2" on and below pixel "B" have a value the same as the background pixel value judged in the parallel-type.

The pixel with an indicative pixel value generated through such processing is regarded as the background pixel value for the next scanning.

When the scan direction is not limited to be from the left to the right or from up to down, these conditions from a-i) to a-v) are generalized as from b-i) to b-v) below.

b-i) The value of the objective pixel is changed to be an indicative pixel value when the previous pixel of the objective pixel along the direction of a scan line and the pixel corresponding to the location of the objective pixel in the previous scan line has the same value as the value of the background pixel or the indicative pixel value, judged in the parallel-type.

b-ii) The objective pixel is kept as it is when the condition does not agree with that in b-i), the pixel corresponding to the location of the objective pixel in the previous scan line in the parallel direction of scan line has the indicative pixel value, and the pixel corresponding to the location of the objective pixel in the next scan line in a parallel direction of scan line has the same value of background pixel, judged in the sequential-type.

b-iii) The objective pixel is kept as it is when the condition does not agree with that in b-i), the pixel on the previous scan line has the indicative pixel value, and the next pixel has the value of background pixel, judged in the sequential-type.

b-iv) The value of the objective pixel is decided to be an indicative pixel value when the condition does not agree with those in b-i) to b-iii), and when the pixel corresponding to the location of the objective pixel on the previous scan line has the indicative pixel value judged in the sequential-type, and the previous and the next pixel of objective pixel have the value of background pixel, judged in the parallel-type.

b-v) The value of the objective pixel is decided to be an indicative pixel value when the condition does not agree with those in b-i) to b-iii), the previous pixel to the objective pixel on the same scan line has the indicative pixel value judged in the sequential-type, the pixels corresponding to the location of the pixel in the previous and the next scan line have the pixel value the same as the peripheral pixel, judged in the parallel-type.

Figures 17A, 17B, 18A, 18B, 19A, 19B:
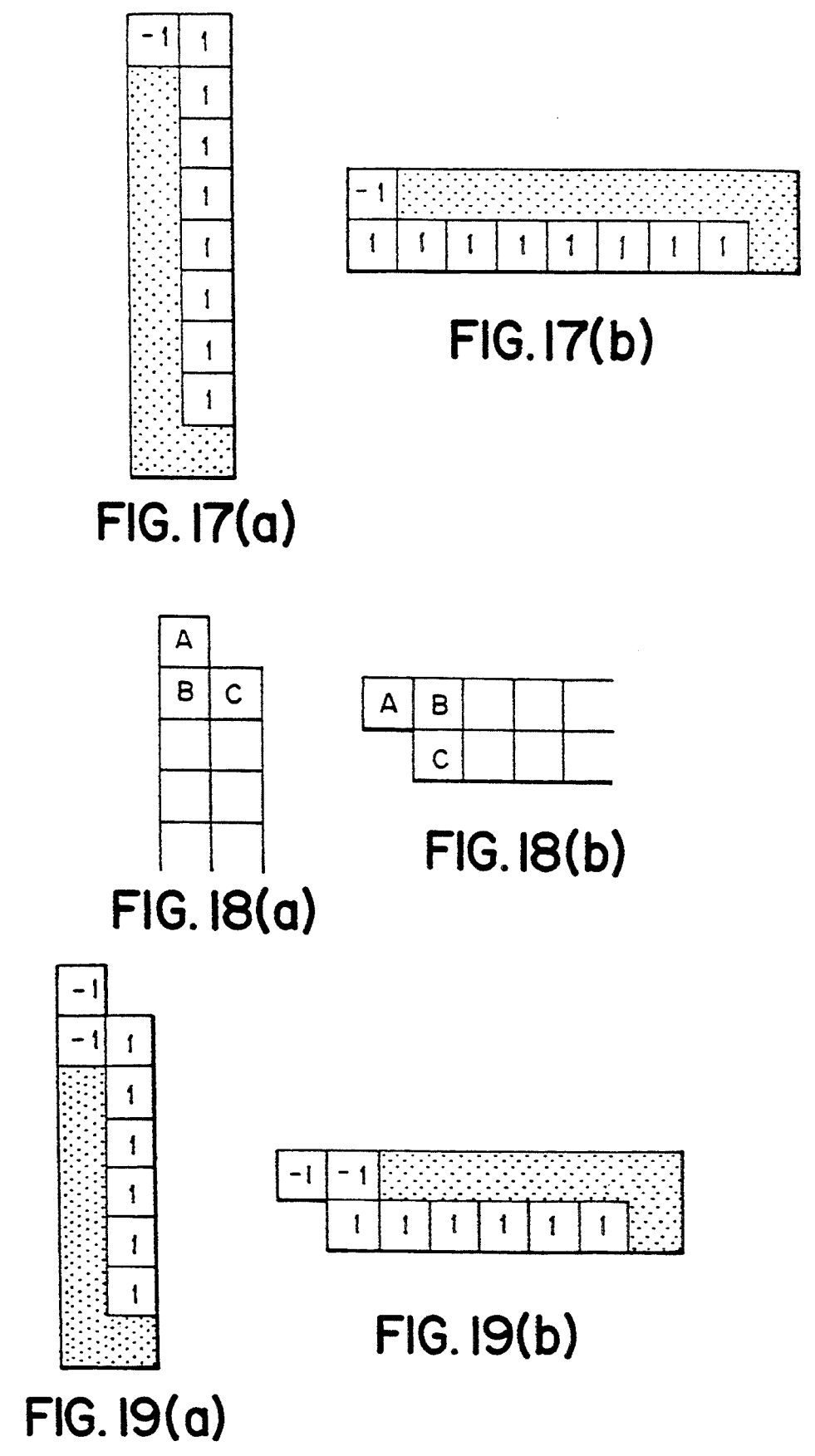

These conditions correspond to the image processing in FIG. 17 to FIG. 19.

FIG. 17 (a) shows a vertical line with a 2 pixel width, corresponding to the conditions in a-i) and a-iii). In this figure, the left pixel on the top of the line is the object to be judged. An indicative pixel value ("−1," for example) is given to it according to the condition in a-i). Next, the right pixel is the object to be judged. Its pixel value is kept as it is ("1," for example) without deciding it to be the background pixel value according to the condition in a-iii). The vertical line with a 2 pixel width is thinned to be a line with one pixel width on the right side, except for the pixel on the bottom, through the processing.

FIG. 17 (b) shows a horizontal line with a 2 pixel width, corresponding to the conditions in a-i) and a-ii). In this figure, the left edge pixel on the top is the object to be judged. An indicative pixel value ("−1," for example) is given to it according to the condition in a-i). All pixels except on the left edge on the top are erased. Next, on the bottom, left edge pixel keeps its pixel value as it is ("1," for example) according to the condition in a-ii). The following pixels are kept in pixel value as they are, in the same way. The horizontal line with 2 pixels is thinned to be a line with a one pixel width of the bottom line, except the pixel on the right edge, through the processing.

FIG. 18 (a) shows a line added pixel "A" on the top left edge to a vertical line with a 2 pixel width, which corresponds to the conditions in a-i) and a-iv). (The figure added a pixel on the top right edge which is processed in the same way.)

Judging the figure by an edge judging condition of a simple parallel-type, the process is as follows. The value of pixel "A" is converted to a peripheral pixel value because "A" is not an edge pixel (it is touched to 2 pixels "B" and "C"). The value of pixel "B" on the left side of 2 pixels width is converted to background pixel value because pixel "A" exists on it. Consequently, the figure dies out.

It is possible to prevent dying out of figure by adding the indicative pixel value to pixel "A" according to condition a-i), and to pixel "B" according to condition a-iv), as shown in FIG. 19 (a). Adopting the conditions, the figure is thinned to the right line of one pixel width, except the pixel on the bottom.

FIG. 18 (b) shows a line added pixel "A" on the top left edge to a horizontal line with 2 pixels width, corresponding to the conditions in a-i) and a-v). (The figure added a pixel on the bottom left edge is processed in the same way.)

Judging the figure by an edge judging condition of a simple parallel-type, the process is as follows. The value of pixel "A" is converted to a peripheral pixel value because "A" is not an edge pixel (it is touched to 2 pixels "B" and "C"). The value of pixel "B" on the left side of 2 pixels width is converted to a peripheral pixel value because pixel "A" exists on it, and at last, all the pixel values of the pixels on the top line are converted to background pixel value. As to the bottom line, the left edge pixel is erased because of the existence of pixel "A," and at last, all the pixel values of the pixels on the bottom line are converted to peripheral pixel value. Consequently, the figure dies out at last.

It is possible to prevent dying out of a figure by adding the indicative pixel value to pixel "A" according to condition a-i), and to pixel "B" according to condition a-v, as shown in FIG. 19 (b). Adopting the conditions, the figure is thinned to the bottom line of a one pixel width, except for the pixel on the right edge.

The thinning processing generates good results because a line with a 2 pixel width is certainly thinned to a 1 pixel width without generating a needless pixel. Furthermore, it is processed in high speed because 1 layer processing of boundary pixels can be completed by one scanning.

It is described above what includes a kind of pixel value outside of a peripheral pixel value in an image. Needless to say, it is possible to perform thinning in the same way for an image with various kinds of pixels. For example, when labeling numbers are added to every group in an image, thinning is performed in the same way as above in every group, or the only figures with labeling numbers to be processed are processed by thinning by regarding the labeling numbers as pixel values to be processed.

The second information compression systems 300, 370, 380 and 390 are constructed by being connected to light computational portion such as a full adder on the branch of output of high speed memory such as a static RAM, and feeding the output of the light computation portion back to the data input of high speed memory. Such structure can perform the same computation on the same data repeatedly, or perform in high speed a complicated computation such as sequential data comparison by a small circuit.

The present apparatus is constructed as a module. Therefore, an input terminal is connected to the preprocessing apparatus, and an output terminal is connected to the following processing apparatus. Consequently, it is possible to easily design an image recognition system. It is not necessary to make software because the present apparatus is of wide-usage. Using the present invention, it is possible to reduce a lot of designer's development quantity, and simultaneously, it is possible to make a digital data processing apparatus of wide-usage and high efficiency for a large quantity.

What is claimed is:

1. A data processing system for rewriting processed data comprising:
   a data inputting terminal which receives inputted digital data;
   computational means for performing parallel processing on said inputted digital data, said parallel-processed data including numerical data and characteristic data, said computational means including numerical computational means for computing numerical computations on said inputted digital data and for outputting said computed numerical data, and characteristics information extracting means separate from the numerical computational means for performing computations on said inputted digital data to obtain characteristic data and for outputting said characteristic data, said characteristic data being indicative of relationships between neighboring bits of said inputted digital data;
   a sequential processing data inputting terminal which receives said parallel-processed numerical data and characteristic data from said computational means;
   sequential processing means, connected to said sequential processing data inputting terminal, for performing sequential processing on said parallel-processed numerical data and characteristic data and outputting a corresponding sequential result, thereby rewriting said digital data parallel-processed by said computational means;

a plurality of information compression means, each of which is separate from the computational means and the numerical computational means and is connected to said computational means, for extracting characteristics values from said characteristic data and outputting said characteristics values;

selector means, connected to said computational means, said sequential means and said plurality of information compression means, for selecting one of said output of said computational means, said sequential processing means, and said information compression means; and an output terminal for outputting said output selected by said selector means.

2. A data processing system as claimed in claim 1, further comprising a free-flag terminal for receiving a free-flag signal which shows whether said data processing system is accessible from a host computer or not.

3. A data processing system as claimed in claim 1, further comprising a mode terminal for receiving a mode signal which shows effectiveness of input signal inputted to said data input terminal and a mode output terminal for outputting a mode output signal which shows effectiveness of output signal from said output terminal.

4. A method for processing data including the steps of:

receiving inputted digital data;

performing parallel processing on said inputted digital data to obtain parallel-processed data including numerical data and characteristic data, said characteristic data being indicative of relationships between neighboring bits of said inputted digital data;

sequentially processing said parallel-processed numerical data and characteristic data to obtain a corresponding sequential result;

extracting characteristics values from said characteristic data;

selecting data from one of said parallel-processed data, said corresponding sequential result, and said extracted characteristics values; and outputting said selected data.

5. A method for processing data as recited by claim 4, further comprising a step of receiving a signal indicating whether access to is available to a host computer.

6. A method for processing data as recited by claim 4, further comprising the steps of:

receiving a mode signal indicating whether said inputted digital data is valid; and outputting a mode output signal indicating validity of said output selected data.

* * * * *